(12) United States Patent
Xu et al.

(10) Patent No.: US 8,946,116 B2
(45) Date of Patent: Feb. 3, 2015

(54) NANOMETER POWDER CATALYST AND ITS PREPARATION METHOD

(75) Inventors: Haibo Xu, Qingdao (CN); Yonghong Lu, Qingdao (CN); Jia Wang, Qingdao (CN); Renxing Sun, Qingdao (CN)

(73) Assignee: Ocean University of China, Qingdao (CN)

( * ) Notice: Subject to any disclaimer, the term of this patent is extended or adjusted under 35 U.S.C. 154(b) by 1505 days.

(21) Appl. No.: 12/441,880

(22) PCT Filed: Sep. 14, 2007

(86) PCT No.: PCT/CN2007/070689
§ 371 (c)(1),
(2), (4) Date: Apr. 12, 2011

(87) PCT Pub. No.: WO2008/040222
PCT Pub. Date: Apr. 10, 2008

(65) Prior Publication Data
US 2011/0207602 A1 Aug. 25, 2011

(30) Foreign Application Priority Data

Sep. 22, 2006 (CN) .......................... 2006 1 0069076
Sep. 22, 2006 (CN) .......................... 2006 1 0069078

(51) Int. Cl.
*B01J 27/22* (2006.01)
*B01J 27/24* (2006.01)
*B01J 23/00* (2006.01)
*B01J 23/40* (2006.01)
(Continued)

(52) U.S. Cl.
CPC ................ *H01M 4/92* (2013.01); *B01J 21/063* (2013.01); *B01J 23/462* (2013.01); *B01J 23/468* (2013.01); *B01J 23/626* (2013.01); *B01J 37/0203* (2013.01); *C25B 1/04* (2013.01);
(Continued)

(58) Field of Classification Search
USPC .................. 502/177, 200, 300, 326, 339, 350
See application file for complete search history.

(56) References Cited

U.S. PATENT DOCUMENTS 4,400,306 A * 8/1983 Dria et al. ..................... 502/171
4,435,521 A * 3/1984 Yang et al. .................... 502/209
(Continued)

FOREIGN PATENT DOCUMENTS

CN        85107320 A     9/1985
JP          2005034779      2/2005
(Continued)

OTHER PUBLICATIONS

International Search Report PCT/CN2007/070689 dated Dec. 27, 2007.

*Primary Examiner* — Cam N. Nguyen
(74) *Attorney, Agent, or Firm* — Michael Fedrick; Loza & Loza, LLP

(57) ABSTRACT

A $TiO_2$-containing composite nano-powder catalyst obtained by combining a titanium-based metal ceramic compound in powder form with a mixing solution containing compound(s) of a platinum group metal and/or a non-noble metal, drying the resulting mixture, and then performing oxidative thermal decomposition on the dried mixture. This catalyst also can be used as a support to further support platinum group metal(s) and/or non-noble metal(s) to obtain another composite nano-powder catalyst. A method for preparing a $TiO_2$-containing composite nano-powder catalyst is also disclosed.

18 Claims, 8 Drawing Sheets

(51) Int. Cl.
  *B01J 23/42* (2006.01)
  *B01J 23/44* (2006.01)
  *H01M 4/92* (2006.01)
  *B01J 21/06* (2006.01)
  *B01J 23/46* (2006.01)
  *B01J 23/62* (2006.01)
  *B01J 37/02* (2006.01)
  *C25B 1/04* (2006.01)
  *C25B 11/04* (2006.01)
  *H01M 4/90* (2006.01)

(52) U.S. Cl.
  CPC ............ *C25B 11/0478* (2013.01); *H01M 4/90* (2013.01); *H01M 4/9075* (2013.01); *H01M 4/921* (2013.01); *H01M 4/925* (2013.01); *Y02E 60/366* (2013.01); *Y02E 60/50* (2013.01)
  USPC ........... 502/326; 502/177; 502/200; 502/300; 502/339; 502/350

(56) References Cited

U.S. PATENT DOCUMENTS

| | | | | |
|---|---|---|---|---|
| 4,582,912 A | * | 4/1986 | Saleh et al. | 549/239 |
| 4,585,540 A | | 4/1986 | Beer et al. | |
| 5,326,735 A | * | 7/1994 | Itoh et al. | 502/177 |
| 5,399,535 A | * | 3/1995 | Whitman | 501/80 |
| 5,935,898 A | * | 8/1999 | Trubenbach et al. | 502/300 |
| 7,803,736 B2 | * | 9/2010 | Rohde et al. | 502/309 |
| 2007/0260002 A1 | * | 11/2007 | Xia et al. | 524/413 |
| 2010/0021334 A1 | * | 1/2010 | Funaki et al. | 419/12 |
| 2011/0160034 A1 | * | 6/2011 | Taniguchi et al. | 501/87 |

FOREIGN PATENT DOCUMENTS

| | | |
|---|---|---|
| JP | 2006224095 | 8/2006 |
| WO | WO2006/062947 A3 | 6/2006 |

\* cited by examiner

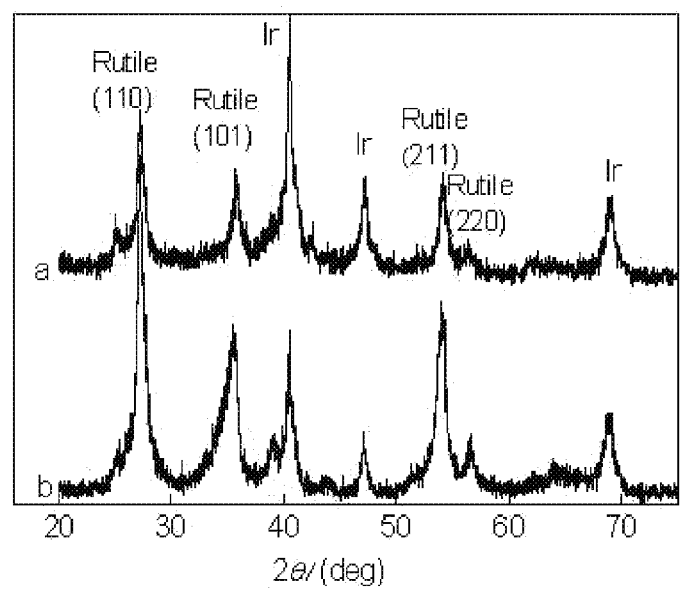
Fig.1
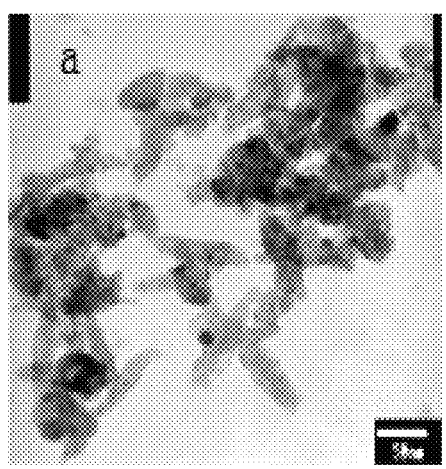 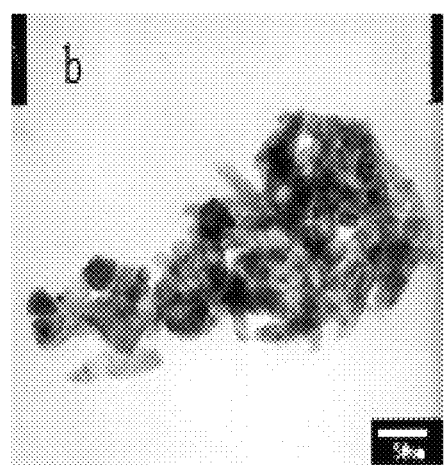
Fig. 2a  Fig. 2b

NANOMETER POWDER CATALYST AND ITS PREPARATION METHOD

CROSS-REFERENCE TO RELATED APPLICATIONS

This application is the U.S. national stage of International Patent Application No. PCT/CN2007/070689, filed Sep. 14, 2007 and entitled NANOMETER POWDER CATALYST AND ITS PREPARATION METHOD, which claims the benefit of priority from Chinese Patent Application No. 200610069076.5 filed on Sep. 22, 2006, and from Chinese Patent Application No. 200610069078.4 also filed on Sep. 22, 2006. The disclosures of the foregoing applications are incorporated herein by reference in their entirety.

FIELD OF THE INVENTION

The invention relates to a $TiO_2$-containing composite nano-powder catalyst and its preparation method, as well as to a composite nano-powder catalyst which is obtained by further supporting platinum group metal(s) and/or non-noble metal(s) on such a $TiO_2$-containing composite nano-powder catalyst and its preparation method.

BACKGROUND OF THE RELATED ART

Hydrogen energy is considered as a highly efficient and clean energy source that has received worldwide attention and become one of the important development directions of new energy sources. The best route to obtain hydrogen is first to generate electricity using low-cost renewable energies, followed by producing hydrogen by proton exchange membrane water electrolysis (PEMWE). The most efficient device that utilizes hydrogen is a fuel cell, especially a proton exchange membrane fuel cell (PEMFC), and one of the key materials for the PEMWE and PEMFC is the electrocatalyst. A proton exchange membrane (PEM) provides an acidic electrolyte environment for PEMWE- and PEMFC-related electrode reaction processes including hydrogen and oxygen electrode reactions, and both theoretical decomposition voltage and cell voltage are 1.23 V. Under such conditions, in addition to meeting the requirements of high conductivity and catalytic activity, the electrocatalyst must have high corrosion resistance and have good electrochemical stability within the potential range of electrocatalysis reactions. Up to now, the electrocatalysts meeting the above requirements are mainly platinum group noble metals and their alloys and oxides. Based on this existing technical situation, worldwide material scientists and chemists are facing demanding challenges of preparing highly efficient, stable, low-cost electrocatalyst with a simple and easy method.

Currently, a mainstream in the water electrolysis field is PEMWE technology. Such technology has resulted in an increase in efficiency from 70% for traditional electrolysis to 85% or more, greatly reducing the energy consumption. At present, a main limitation to the industrial application of PEMWE technology is the high cost of materials. The proton exchange membrane now can be produced in a mass batch, and thus the expense is expected to be reduced to an acceptable level. Accordingly, a key to cost reduction is focused on the choice and preparation process of the electrocatalyst for hydrogen and oxygen evolution. The hydrogen-evolution catalyst for PEMWE mainly belongs to the Pt group, and the cathode is treated with a noble metal oxide (such as $RuO_2$, $IrO_2$, etc.) to avoid Pt poisoning and inactivation caused by an underpotential deposition. Among these, $Ru_xTi_{1-x}O_2$ shows excellent resistance to chloride and iron ions. The best known oxygen-evolution catalyst for PEMWE is $IrO_2$. Marshall et al., (Marshall A, BØrresen B, Hagen G, et al. Electrochimica Acta, 2006, 51(15): 3161-3167) applied $IrO_2$ as the oxygen evolution catalyst for PEMWE. In their work, it was reported that, under an electrolysis temperature of 90° C. and working current density of 1 $A/cm^2$, its cell voltage is 1.61V, indicating an outstanding oxygen-evolution electrocatalyst. However, the expense of using pure $IrO_2$ is too high and there is room for further electro-catalytic performance improvement.

The oxygen reduction electrocatalyst for PEMFC is the most essential factor concerning cell performance and cost, which needs about 0.4 V overpotential in cathodic polarization, and uses a large amount of noble metal catalyst resulting in a low noble metal utilization rate. Pt and its alloy supported on carbon is the only electrocatalyst showing some activity for oxygen reduction at low temperature and in acidic electrolyte. Pt/C produced by E-Tek Inc. of USA has been used by a number of institutes and companies all over the world, due to its excellent electrocatalytic performance for cathode oxygen reduction. However, many studies have shown that, after long-term operation, some phenomena related to a weak interaction between Pt and C occur, such as transfer, aggregation and corrosion of Pt. Besides this, the corrosion of the carbon support was also found. To solve these problems, Halalay and Merzougui et al. used titanium nitride, titanium carbide or titanium dioxide to support platinum and its alloys to prepare a catalyst in US20060246344 A1 and WO2006119407, respectively. However, this method brought a problem of poor catalyst conductivity, and therefore, they added carbon powder or titanium nitride and titanium carbide with good conductivity into the catalyst during the preparation of a membrane electrode to enhance the conductivity in the above two patents. Results show that the conductivity of the support is poor and the nanoscale titanium nitride and titanium carbide powder has significantly reduced conductivity and anti-oxidation properties, which has a negative impact on the long-term stability of the catalyst. In addition, inclusion of conductive powder that has no catalytic activity in the membrane electrode would inevitably reduce the effective catalytic active surface.

Because a noble metal of the platinum group has to be used in the catalyst design, as little as possible should be used while still ensuring catalytic activity. Other concerns such as conductivity, high specific surface area, stability and ease of preparation of a nano-powder should also be considered. The preparation method has a significant influence on the catalytic properties, amount of supported noble metal and noble metal efficiency of the catalyst. At present, the preparation methods of nano-powder catalysts mainly include the physical vapor deposition method, chemical vapor deposition method, homogeneous precipitation method, direct precipitation method, sol-gel method, organic complex precursor method, hydro-thermal synthesis method, micro-emulsion method, solid phase method, coating method, radiation chemical synthesis method, electrochemical precipitation method, Adams melt casting method, impregnation-liquid phase reduction method, vapor reduction method, high temperature alloying method, microwave thermal synthesis method and metal-organic compound thermal decomposition method, and so on. These methods have been widely used to give various kinds of nano-powder catalysts. However, although great development has been achieved, it is hard to satisfy the comprehensive properties for nano-powder catalyst by current preparation methods.

Therefore, the urgent problems in this field include: using non-noble metals to form multiple composite oxides with different electrochemical properties, so as to reduce the amount of the noble metal; developing a new catalyst or catalyst support with excellent conductivity, corrosion-resistance and anti-oxidation properties to replace conventional carbon materials; and developing a new method for preparing a nano-powder catalyst at low cost, under the premises of using a low amount of noble metal and providing excellent electrocatalytic properties and long term stability.

SUMMARY OF THE INVENTION

An aim of the invention is to provide a $TiO_2$-containing composite nano-powder catalyst with a certain molar ratio of platinum group metal and/or non-noble metal to titanium. This product can be used not only as a catalyst itself, but also as a support to platinum group metal(s) and/or non-noble metal(s) to obtain another composite nano-powder catalyst. These two composite nano-powder catalysts have the advantages of using a small amount of noble metal, high electrocatalytic activity, good conductivity, excellent stability, and long service life, etc.

Another aim of the invention is to provide a preparation method for the above-mentioned $TiO_2$-containing composite nano-powder catalyst, with easy manufacturing and low cost.

To achieve the above aims, the invention first provides a $TiO_2$-containing composite nano-powder catalyst, which is a product obtained by the following procedures: impregnating a titanium-based metal ceramic compound powder into a mixed solution containing compound(s) of platinum group metal and/or non-noble metal, then drying, and finally performing oxidative thermal decomposition. In such catalyst, the molar ratio of the platinum group metal and/or non-noble metal to titanium can be from 1:1 to 1:25, preferably from 1:1 to 1:10. This composite nano-powder catalyst can be further used as a support to support platinum group metal and/or non-noble metal material(s). Such composite nano-powder catalyst has a relatively low amount of noble metal, and the composite metal oxides formed therefrom have good conductivity, corrosion resistance and electrocatalytic activity; moreover, compared with the carbon material, it has excellent resistance to electrochemical oxidation in acidic solution. The non-noble metal oxides account for a significant proportion in the composite nano-powder catalyst, which is important for cost control.

Moreover, the invention provides a composite nano-powder catalyst, which is a product obtained by further supporting one or more platinum group metal(s) and/or non-noble metal(s) on the above $TiO_2$-containing composite nano-powder catalyst. In such catalyst, the amount of the supported platinum group metal(s) and/or non noble metal(s) is from 0.5% to 60%, based on the total mass of the catalyst. In this composite nano-powder catalyst, small Pt particles are adhered evenly on the support surface, thus increasing the active surface area and enhancing the noble metal efficiency. Under a low current density, the catalyst has nearly the same electrocatalytic performance for hydrogen evolution as that of Pt/C; under a high current density, it has better electrocatalytic performance than that of Pt/C, and besides, it also shows outstanding electrocatalytic performance when it is used as a catalyst for cathodic oxygen reduction in a proton exchange membrane fuel cell.

The invention further provides a method for preparing the above $TiO_2$-containing composite nano-powder catalysts, which includes the following steps: preparing a mixing solution containing compound(s) of platinum group metal and/or non-noble metal as a precursor reaction solution; impregnating said titanium-based metal ceramic compound powder into the precursor reaction solution; drying the mixture thus obtained and then decomposing it under oxidative thermal conditions; cooling, finally grinding to obtain the catalyst powder. According to practical needs, these following steps can be repeated until the molar ratio of platinum group metal and/or non-noble metal to titanium in catalyst product meets the requirement: impregnating said titanium-based metal ceramic compound powder into the precursor reaction solution; drying the mixture thus obtained and then decomposing it under oxidative thermal conditions; cooling, finally grinding to obtain the catalyst powder. That is, the process of impregnating-stirring-drying-oxidative thermal decomposing-cooling-grinding is recycled until a composite nano-powder catalyst with a desired molar ratio of the thermal decomposition product of platinum group metal and/or non-noble metal compounds to titanium can be obtained. The composite nano-powder catalyst can be further subjected to an annealing treatment as required.

The invention further provides a method for preparing a composite nano-powder catalyst which is produced by using the above $TiO_2$-containing composite nano-powder catalyst as a carrier to support one or more platinum group metal(s) and/or non-noble metal(s). Specifically, the $TiO_2$-containing composite nano-powder catalyst is prepared, and then one or more platinum group metal(s) and/or non-noble metal(s) is/are supported on the surface of the catalyst used as a support by a physical or chemical deposition method. The main steps of this preparing method include: preparing said $TiO_2$-containing composite nano-powder catalyst by using the above-described method, and supporting one or more platinum group metal(s) and/or non-noble metal(s) on the surface of said $TiO_2$-containing composite nano-powder catalyst by a physical or chemical deposition method to obtain a new composite nano-powder catalyst.

When preparing the $TiO_2$-containing composite nano-powder catalyst and preparing another composite nano-powder catalyst supported on the former, the precursor reaction solution used is composed of the compound(s) of platinum group metal and/or non-noble metal, hydrochloric acid, and organic alcohol or water. Specifically, the used compound of platinum group metal and/or non-noble metal may be the well known compound of platinum group metal and/or non-noble metal in this fields, for example the halides or oxysalts and the like. The used organic alcohol may be low carbon alcohol, such as C2-C4 alcohols and the like. The used powdery titanium-based metal ceramic compound may be one or more of boride, carbide, nitride, carbonitride, oxynitride, oxyboride and oxycarbide of titanium which is in the form of powder, and the powdery titanium-based metal ceramic compound has a specific surface area of 0.2-220 $m^2$/g, a particle size of 1 nm-10 µm, and preferably 5 nm-100 nm. The used platinum group metal may be Ru, Rh, Pd, Os, Ir or Pt, etc., the used non-noble metal may be Sn, Co, Sb, Mn, Ni, Fe, Cu, W, V, Mo, Cr, Pb or Cd, etc. The temperature used in the drying treatment may be about 20-150° C.; the temperature during the oxidative thermal decomposition treatment may be about 200-800° C., and the oxidative thermal decomposition process can be carried out in the air, or under a controlled oxidation atmosphere; moreover, the product obtained after the oxidative thermal decomposition treatment can be subjected to an annealing treatment at a controlled temperature of about 200-1000° C., so as to obtain a more stable composite nano-powder catalyst.

When further preparing the composite nano-powder catalyst by using the $TiO_2$-containing composite nano-powder catalyst as a support, a physical or chemical deposition method can be applied to support one or more active component(s) of platinum group metal and/or non-noble metal on the surface of the $TiO_2$-containing composite nano-powder catalyst, and said deposition method can be certain well known and applicable method, such as physical vapor deposition method, chemical vapor deposition method, homogeneous precipitation method, direct precipitation method, sol-gel method, organic complex precursor method, hydrothermal synthesis method, micro-emulsion method, solid phase method, coating method, radiation chemical synthesis method, electrochemical precipitation method, Adams melt casting method, impregnation-liquid phase reduction method, vapor reduction method, high temperature alloying method, microwave thermal synthesis method or metal-organic compound thermal decomposition method.

These two composite nano-powder catalysts provided by the invention have the advantages of small amount of noble metal, high electrocatalytic activity, good conductivity, good corrosion resistance and anti-oxidation, excellent stability, and long service life; moreover the preparing method has the advantages of easy manufacturing and low cost. The composite nano-powder catalyst obtained by the preparing method in the invention can be widely used in various industrial fields such as electrochemical engineering, water electrolysis, fuel cell, photo catalysis, sewage treatment and electrometallurgy.

DESCRIPTION OF DRAWINGS

FIG. 1 is X-ray diffraction spectrum of iridium-$TiO_2$-containing composite nano-powder catalyst with and without annealing treatment.

FIG. 2 are TEM images of iridium-$TiO_2$-containing composite nano-powder catalyst with and without annealing treatment.

SPECIFIC EMBODIMENTS

Example 1

Figure 3A:
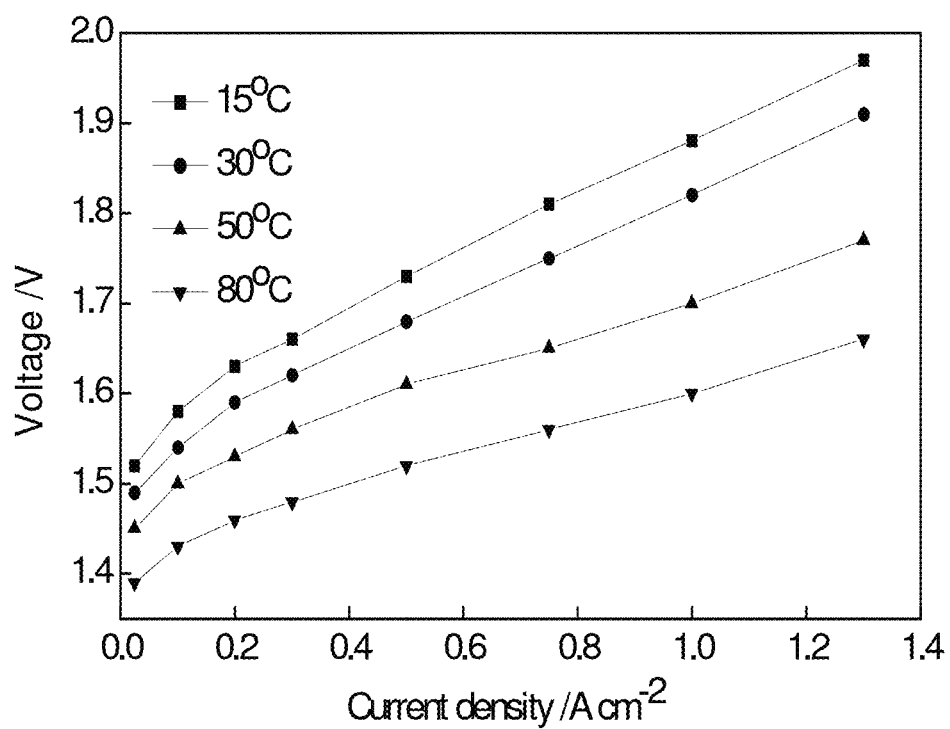
FIG. 3 are volt-ampere curves for PEM water electrolysis with membrane electrodes prepared by iridium-$TiO_2$-containing composite nano-powder catalyst with and without annealing treatment.

According to the method for preparing the composite nano-powder catalyst of the invention, firstly, chloroiridic acid, n-butanol and concentrated hydrochloric acid were uniformly mixed with certain volume ratio to form a precursor reaction solution, which was then taken in a certain amount to impregnate TiN powder (average particle size: 14 nm, specific surface area: 80 $m^2/g$, purity: more than 97%); after thorough stirring, the mixture was dried in oven at 120° C. for 45 minutes, and then was subjected to an oxidative thermal decomposition treatment at 350° C. under air atmosphere for 15 minutes; after that, the resultant was taken out and air-cooled followed by a grinding treatment. The above procedures were repeated until the molar ratio of Ir to Ti was 1:6.5, and finally the resultant was subjected to oxidative thermal decomposition treatment at 350° C. under air atmosphere for 1 hour to produce $TiO_2$-containing nano-powder catalyst sample A. The nano-powder catalyst sample A was subjected to an annealing treatment at 500° C. under air atmosphere for 1 hour to prepare the nano-powder catalyst sample B.

Example 2

According to the method for preparing the composite nano-powder catalyst of the invention, firstly, ruthenium trichloride, isopropyl alcohol and concentrated hydrochloric acid were uniformly mixed with a certain volume ratio to form a precursor reaction solution, which was then taken in a certain amount to impregnate $TiB_2$ powder (average particle size: 8 nm, specific surface area: 180 $m^2/g$, purity: more than 97%); after thorough stirring, the mixture was dried in oven at 70° C. for 120 minutes, and then was subjected to an oxidative thermal decomposition treatment at 550° C. under air atmosphere for 15 minutes; after that, the resultant was taken out and air-cooled to room temperature followed by a grinding treatment. The above procedures were repeated until the molar ratio of Ru to Ti was 2:8, and finally the resultant was subjected to an oxidative thermal decomposition treatment at 550° C. under air atmosphere for 1 hour to produce the nano-powder catalyst sample C.

Example 3

According to the method for preparing the composite nano-powder catalyst of the invention, firstly, ruthenium trichloride, isopropyl alcohol and concentrated hydrochloric acid were uniformly mixed with a certain volume ratio to form a precursor reaction solution, which was then taken in a certain amount to impregnate $TiB_2$ powder (average particle size: 8 nm, specific surface area: 180 $m^2/g$, purity: more than 97%); after thorough stirring, the mixture was dried in oven at 70° C. for 120 minutes, and then was subjected to an oxidative thermal decomposition treatment at 550° C. under air atmosphere for 15 minutes; after that, the resultant was taken out and air-cooled followed by a grinding treatment. The above procedures were repeated until the molar ratio of Ru to Ti was 2:8, and finally the resultant was subjected to the oxidative thermal decomposing treatment at 550° C. under air atmosphere for 1 hour to produce a composite nano-powder catalyst. Then, platinum was supported on this powder catalyst by a microwave thermal synthesis method to produce the composite nano-powder catalyst sample D with Pt of 20 mass %.

Example 4

According to the method for preparing the composite nano-powder catalyst of the invention, firstly, stannous chloride, n-butanol and concentrated hydrochloric acid were uniformly mixed with a certain volume ratio to form a precursor reaction solution, which was then taken in a certain amount to impregnate TiN powder (average particle size: 14 nm, specific surface area: 80 m$^2$/g, purity: more than 97%); after thorough stirring, the mixture was dried in oven at 120° C. for 45 minutes, and then was subjected to an oxidative thermal decomposition treatment at 450° C. under air atmosphere for 15 minutes; after that, the resultant was taken out and air-cooled followed by a grinding treatment. The above procedures were repeated until the molar ratio of Sn to Ti was 1:8, and finally the resultant was subjected to oxidative thermal decomposition treatment at 450° C. under air atmosphere for 1 hour to produce the composite nano-powder catalyst. Then, platinum was supported on this powder catalyst by an impregnation-liquid phase reduction method to produce the composite nano-powder catalyst sample E with Pt of 40 mass %.

Example 5

According to the method for preparing the composite nano-powder catalyst of the invention, firstly, stannous chloride, chloro iridic acid, water and concentrated hydrochloric acid were uniformly mixed with a certain volume ratio to form a precursor reaction solution, which was then taken in a certain amount to impregnate TiC powder (average particle size: 40 nm, specific surface area: 120 m$^2$/g, purity: more than 97%); after thorough stirring, the mixture was dried in oven at 90° C. for 75 minutes, and then was subjected to an oxidative thermal decomposition treatment at 250° C. under oxidative atmosphere for 15 minutes; after that, the resultant was cooled in vacuum followed by a grinding treatment. The above procedures were repeated until the molar ratio of Sn:Ir:Ti was 2:1:6, and finally the resultant was subjected to oxidative thermal decomposition treatment at 250° C. under oxidative atmosphere for 1 hour and then was subjected to an annealing treatment at 300° C. under oxidative atmosphere for 1 hour, to produce the $SnO_2$—$IrO_x$—$TiO_2$ composite nano-powder; then, platinum and ruthenium were supported on this powder catalyst by an homogeneous precipitation method to produce the PtRu/$SnO_2$—$IrO_x$—$TiO_2$ composite nano-powder catalyst with Pt and Ru of 20 mass % and 10 mass %, respectively.

Example 6

According to the method for preparing the composite nano-powder catalyst of the invention, firstly, chloroiridic acid, chloroplatinic acid, water and concentrated hydrochloric acid were uniformly mixed with a certain volume ratio to form a precursor reaction solution, which was then taken in a certain amount to impregnate TiN powder (average particle size: 2 μm, specific surface area: 0.75 m$^2$/g, purity: more than 97%); after thorough stirring, the mixture was dried in oven at 90° C. for 75 minutes, and then was subjected to an oxidative thermal decomposition treatment at 450° C. under oxidative atmosphere for 15 minutes; after that, the resultant was cooled in vacuum followed by a grinding treatment. The above procedures were repeated until the molar ratio of Ir:Pt:Ti was 1:1:5.5, and finally the resultant was subjected to oxidative thermal decomposition treatment at 450° C. under oxidative atmosphere for 1 hour and then was subjected to an annealing treatment at 300° C. under oxidative atmosphere for 1 hour, to produce the Pt—$IrO_x$—$TiO_2$ composite nano-powder catalyst.

By examples of the obtained $TiO_2$-containing composite nano-powder catalyst or the composite nano-powder catalyst using the former as a carrier (samples A to E), the application effects were evaluated.

The X-ray diffraction (XRD) spectrums of the obtained nano-powder catalyst samples A and B are shown in FIG. 1 as a and b. It can be observed from FIG. 1 the peaks of rutile phase and metal iridium, but the peaks of $TiO_2$ and $IrO_x$ were not detected. Because the ionic radius of $Ir^{4+}$ is very similar to that of $Ti^{4+}$, and both $IrO_x$ and $TiO_2$ belong to rutile crystal type, theoretically speaking, these two can be replaced by each other efficiently; therefore, it can be ascertained that $IrO_x$—$TiO_2$ in samples A and B exists in rutile solid solution form. Meanwhile, it can be calculated according to the XRD that the particle size of rutile phase $IrO_x$—$TiO_2$ in the nano-powder without annealing treatment is 12 nm, while the particle size of metal Ir is 7 nm. Sample B was the nano-powder catalyst that was subjected to the annealing treatment at 500° C., and from FIG. 1, changes in the relative intensity of the peaks and the peak separation phenomenon can be observed, indicating that solid solution separation occurred to some extent after the annealing treatment at 500° C.

The TEM images of the produced nano-powder catalyst samples A and B are shown in FIG. 2. It can be seen from image a in FIG. 2 that small particles with particle diameter of about 7 nm were evenly distributed on large particles in long strip shape, wherein the obtained small particles were metal iridium, while the large particles corresponded to the solid solution of rutile phase $IrO_x$—$TiO_2$. It can be seen from image b of FIG. 2 that, after the nano-powder A was subjected to the annealing treatment at 500° C., powder aggregation occurred to some extent, the metal iridium particles enriched on the surface were reduced significantly, and the XRD diffraction peak corresponding to metal iridium was decreased in intensity; however, the conclusion of the research proved that the annealing treatment can enhance the crystallinity, thus further increasing the stability of the powder.

Figure 3B:
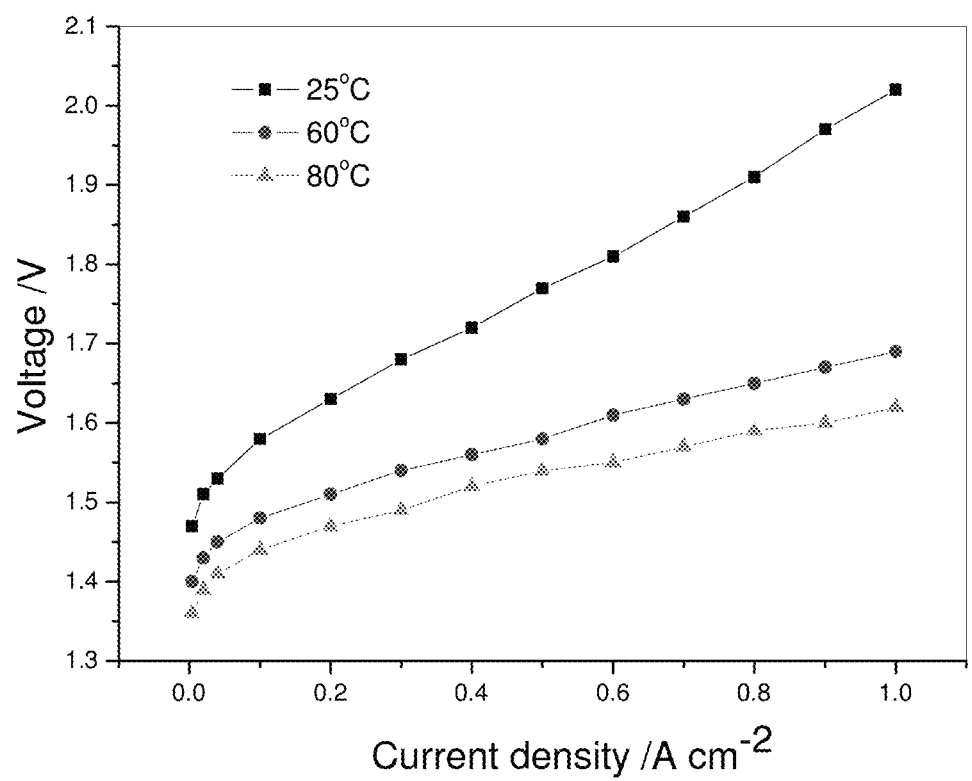

The nano-powder catalyst samples A and B were measured for their hydrogen evolution electrocatalytic activity in a PEM water electrolysis cell, and the results are shown in graphs a and b in FIG. 3 respectively. It can be seen from graphs a and b that the cell performance was improved with increasing electrolytic temperature. This is because the increased temperature is beneficial to increase the electrochemical reaction rate and the transfer rate of protons in the electrolyte membrane. Prior to this invention, it was reported that the cell potential was 1.61V under the condition of a temperature of 90° C. and a current density of 1 A/cm$^2$, showing that the electrocatalyst of pure $IrO_2$ (amount: 2.4 mg/cm$^2$) has excellent catalytic performance. It can be seen from graphs a and b in FIG. 3 that, in the case of the nano-powder catalyst samples A and B with the amount of noble metal Ir of 1.2 mg/cm$^2$ (that is, the amount of noble metal was half-decreased), the cell potential was both 1.6V under the condition of the temperature of 80° C. and the current density of 1 A/cm$^2$, showing better electrocatalytic performance; moreover, $IrO_x$—$TiO_2$ was a very stable binary composite oxide.

Figure 4:
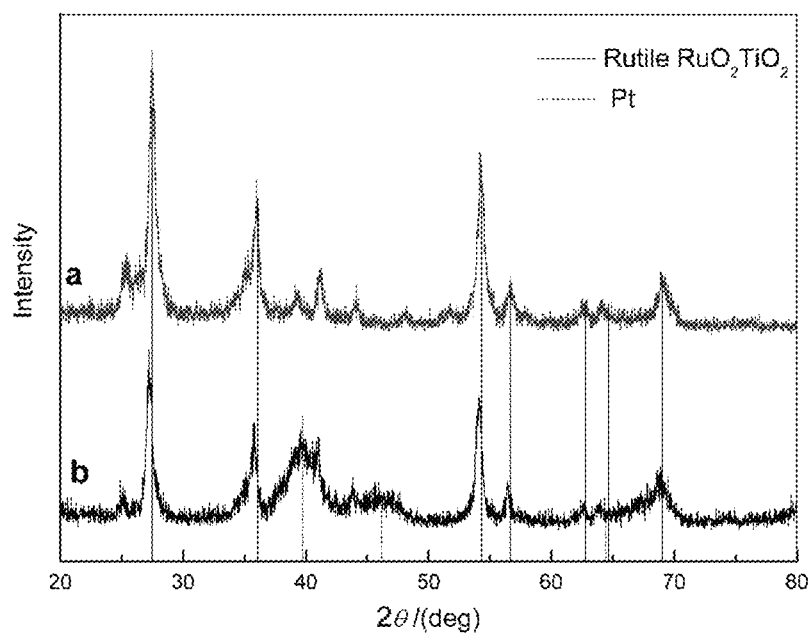
FIG. 4 is X-ray diffraction spectrum of ruthenium dioxide-titanium dioxide composite nano-powder and the nano-powder catalyst with platinum supported on the ruthenium dioxide-titanium dioxide composite nano-powder.

The X-ray diffraction (XRD) spectrums of the produced nano-powder catalyst samples C and D are shown as a and b in FIG. 4. Since the ionic radius of Ru is very similar to that of Ti, and crystalline structures of oxides thereof are quite similar, it is easy for them to form a solid solution. Through analyzing the spectrum, no $RuO_2$ characteristic peak was found, and only strong peaks of rutile type $TiO_2$ with, however, different deviations were observed, indicating that these two oxides formed a $TiO_2$-based rutile solid solution, and the nano-powder catalyst sample C was $RuO_2$—$TiO_2$ existing in the form of solid solution. The composite nano-powder catalyst sample D was $RuO_2$—$TiO_2$, whose surface was evenly loaded with Pt nanoparticles, wherein the corresponding rutile phase peak of the oxide support further deviated greatly and the characteristic peak of Pt also deviated, showing a strong interaction between Pt and the support.

Figure 5A:
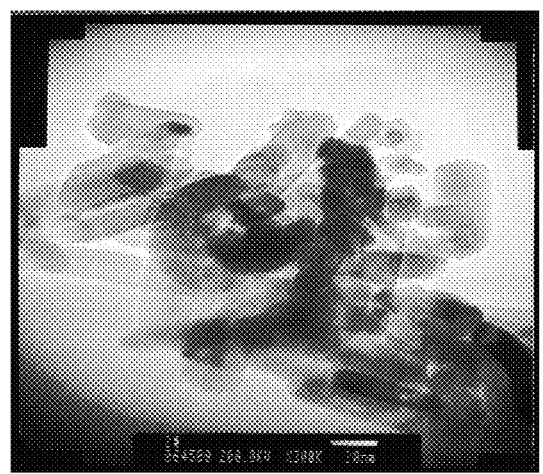
FIGS. 5a and 5b are TEM images of ruthenium dioxide-titanium dioxide composite nano-powder and the nano-powder catalyst with platinum supported on the ruthenium dioxide-titanium dioxide composite nano-powder, respectively.
Figure 5B:
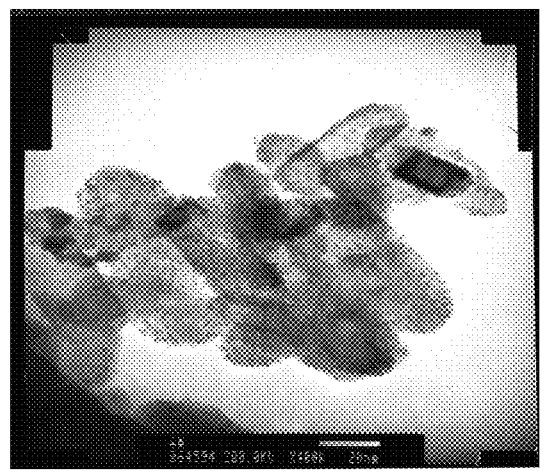

The TEM images of the produced nano-powder catalyst samples C and D were shown as FIGS. 5a and 5b. It can be seen from FIG. 5a that the oxide particles of $RuO_2$—$TiO_2$ were in stick shape with a length of 40-80 nm. After being loaded with Pt, as shown in FIG. 5b, the support was still in stick shape, and it can be distinctly detected that their surfaces were evenly distributed with small particles of Pt with a particle diameter of 2 to 3 nm. Such structure can greatly increase the reactive surface area, thus increasing the noble metal utilization efficiency.

Figure 6:
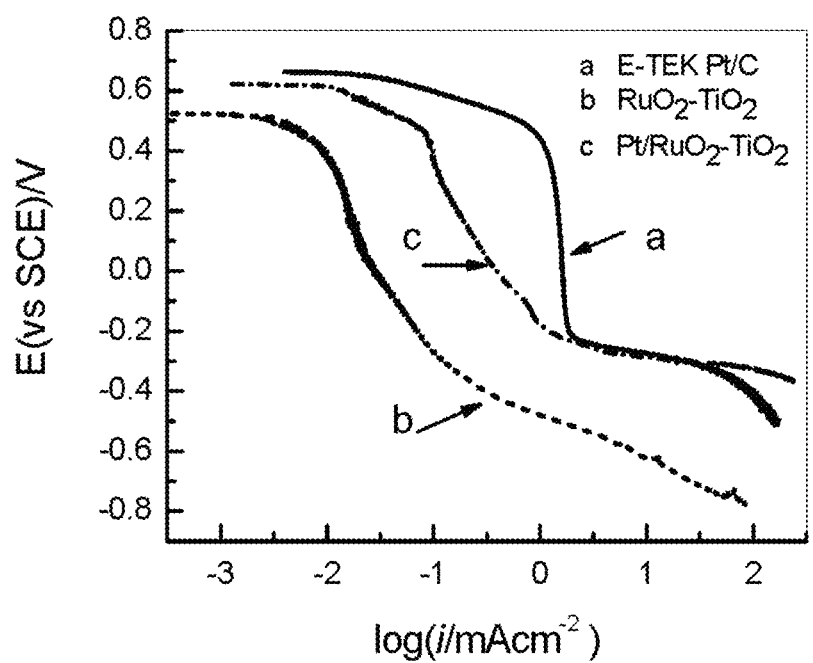
FIG. 6 is hydrogen evolution polarization curves of ruthenium dioxide-titanium dioxide composite nano-powder, the nano-powder catalyst with platinum supported on the ruthenium dioxide-titanium dioxide composite nano-powder and Pt/C system.
Figure 7:
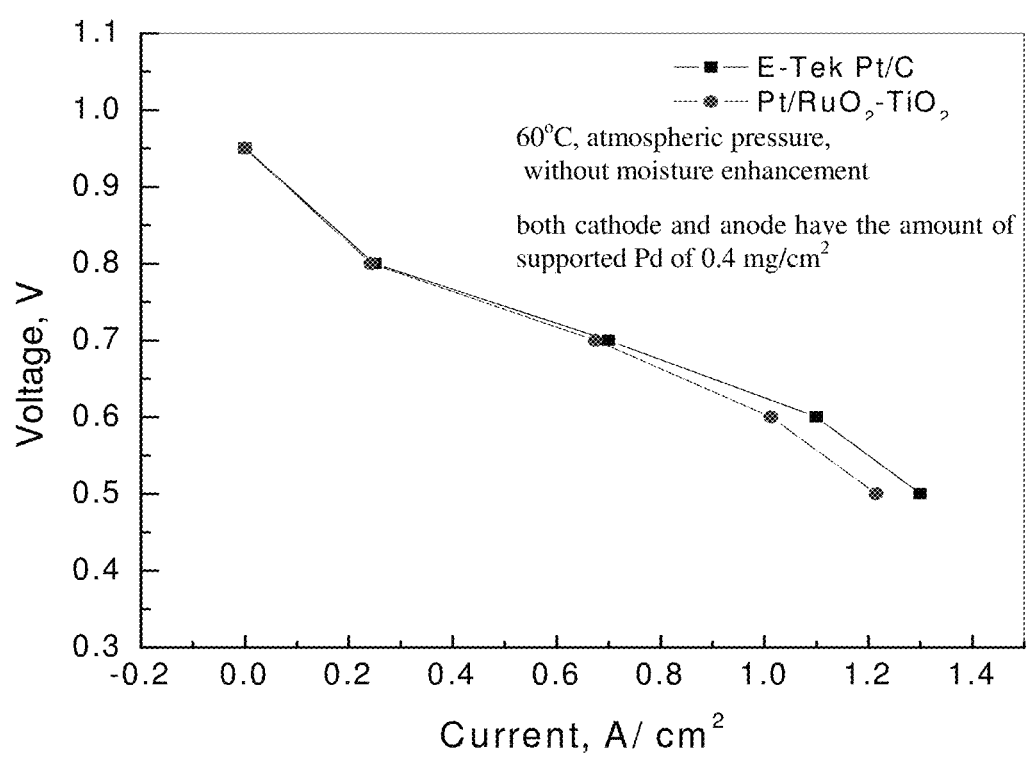
FIG. 7 is proton exchange membrane fuel cell working curves of the nano-powder catalyst with platinum supported on the ruthenium dioxide-titanium dioxide composite nano-powder and Pt/C system.

FIG. 6 showed the comparison of hydrogen evolution catalysts ($RuO_2$—$TiO_2$ nano-powder catalyst sample C and Pt/$RuO_2$—$TiO_2$ sample D using sample C as a support) and Pt/C commercialized by E-Tek Inc. (both sample D and Pt/C had the amount of supported Pt of 0.2 mg/cm$^2$). The results showed that Pt/$RuO_2$—$TiO_2$ and Pt/C had basically the same electrocatalytic performance for hydrogen evolution under a low current density, whereas the activity of Pt/$RuO_2$—$TiO_2$ was much better than that of Pt/C under a high current density, and the polarization resistance thereof was much lower than that of Pt/C; therefore, $RuO_2$—$TiO_2$ had better conductivity than the carbon support. As the catalyst for oxygen cathode side in the proton exchange membrane fuel cell, Pt/$RuO_2$—$TiO_2$ supported on $RuO_2$—$TiO_2$ nano-powder showed very good electrocatalytic performance, and the catalytic performance of Pt/$RuO_2$—$TiO_2$ was close to that of Pt/C commercialized by E-Tek Inc. under the condition of 60° C., atmosphere pressure and without moisture enhancement (as shown in FIG. 7). To verify the stability of Pt/$RuO_2$—$TiO_2$ catalyst in PEMFC, a 10-minute anti-polarization experiment was done, and the results showed that the catalytic activity of Pt/$RuO_2$—$TiO_2$ was maintained, whereas the Pt/C from E-Tek Inc. had 70% reduction in catalytic performance and the carbon support was eroded.

Figure 8:
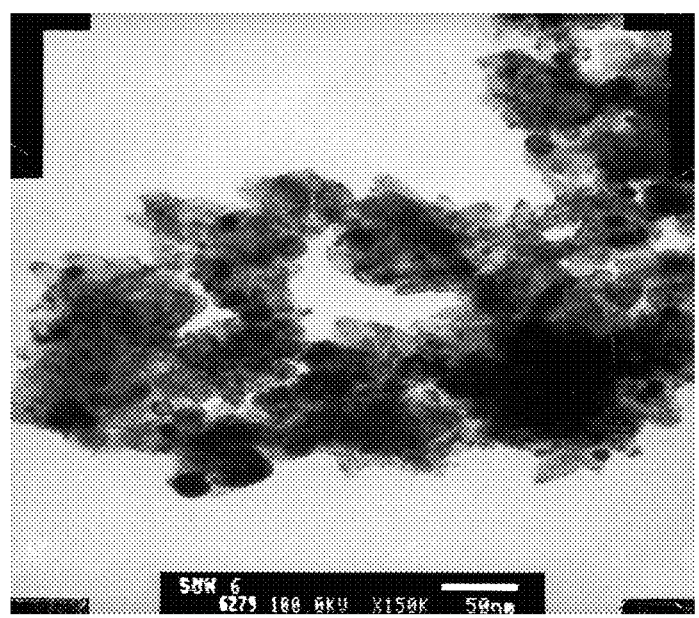
FIG. 8 is a TEM image of the nano-powder catalyst with platinum supported on the tin dioxide-titanium dioxides composite nano-powder.
Figure 9:
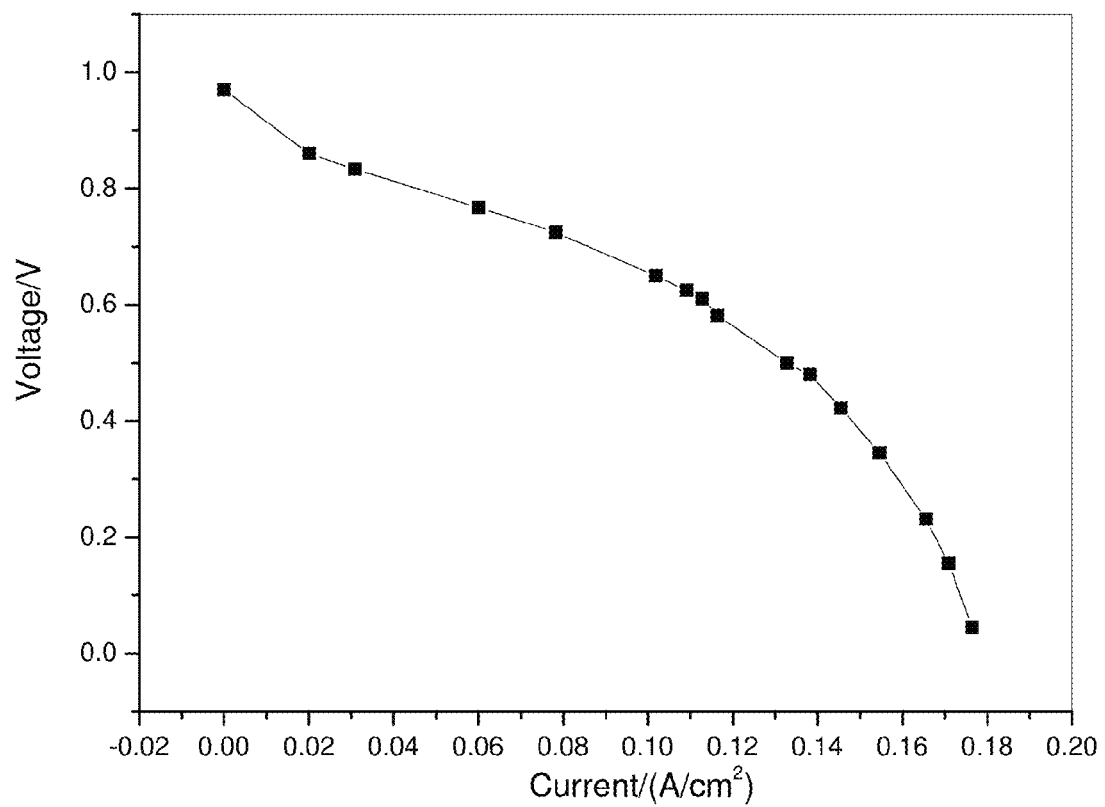
FIG. 9 is a polarization curve for proton exchange membrane fuel cell using the nano-powder catalyst with platinum supported on the tin dioxide-titanium dioxides composite nano-powder.

The TEM image of the produced Pt/$SnO_2$—$TiO_2$ composite nano-powder catalyst E was shown in FIG. 8. It can be seen from FIG. 8 that small particles with a particle diameter of less than 5 nm were adhered on the surfaces of large particles, wherein the precipitated small particles were metal particles of platinum, and the large particles corresponded to the solid solution of rutile $SaO_2$—$TiO_2$. FIG. 9 showed a polarization curve of the membrane electrode prepared by the nano-powder catalyst with platinum supported on the $SaO_2$—$TiO_2$ composite nano-powder in PEMFC, and the test conditions were room temperature, atmosphere pressure, without moisture enhancement, and the amount of Pt was 0.4 mg/cm$^2$ for both cathode and anode. It can be seen from FIG. 9 that the voltage was 0.68 V under a current density of 0.1 A/cm$^2$, showing a superb electrocatalytic performance, thus proving that the composite preparation of nano-powder catalyst from Pt and non-noble metal oxide is possible.

The foregoing descriptions are only preferable examples of this invention, which are not intended to limit the invention in any form. If any person skilled in the art can make equivalent examples with local modifications and variations by using the technical content disclosed in the invention without departing from the range of technical features provided by the invention, and these examples do not depart from the technical features of the invention, all of these will belong to the range of the technical features of the invention.

The invention claimed is:

1. A $TiO_2$-containing composite nano-powder catalyst obtained by:
   impregnating a powder comprising a titanium-based metal ceramic compound with a mixing solution that contains a compound comprising a platinum group metal and/or a non-noble metal, thereby creating a mixture, wherein the titanium-based metal ceramic compound has a particle size of between 1 nanometer and 100 nanometers;
   drying the mixture; and then
   performing an oxidative thermal decomposition.

2. The $TiO_2$-containing composite nano-powder catalyst according to claim 1, wherein the catalyst has a molar ratio of the platinum group metal and/or non-noble metal to titanium of between 1:1 and 1:25.

3. The $TiO_2$-containing composite nano-powder catalyst according to claim 1, wherein the titanium-based metal ceramic compound is selected from the group consisting of titanium boride, titanium carbide, titanium nitride, titanium carbonitride, titanium oxynitride, titanium oxyboride, and titanium oxycarbide.

4. The $TiO_2$-containing composite nano-powder catalyst according to claim 1, wherein the titanium-based metal ceramic compound has a specific surface area of between 0.2 m$^2$/g and 220 m$^2$/g.

5. The $TiO_2$-containing composite nano-powder catalyst according to claim 1, wherein the catalyst comprises a platinum group metal selected from the group consisting of Ru, Rh, Pd, Os, Ir and Pt.

6. The $TiO_2$-containing composite nano-powder catalyst according to claim 1, wherein the catalyst comprises a non-noble metal selected from the group consisting of Sn, Co, Sb, Mn, Ni, Fe, Cu, W, V, Mo, Cr, Pb and Cd.

7. The $TiO_2$-containing composite nano-powder catalyst according to claim 1, wherein the oxidative thermal decomposition is performed at between 200° C. and 800° C.

8. A composite nano-powder catalyst obtained by further supporting one or more platinum group metals and/or non-noble metals on the $TiO_2$-containing composite nano-powder catalyst according to claim 1.

9. The composite nano-powder catalyst according to claim 8, wherein the catalyst comprises a platinum group metal selected from the group consisting of Ru, Rh, Pd, Os, Ir and Pt.

10. The composite nano-powder catalyst according to claim 8, wherein the catalyst comprises a non-noble metal selected from the group consisting of Sn, Co, Sb, Mn, Ni, Fe, Cu, W, V, Mo, Cr, Pb and Cd.

11. A method of preparing a $TiO_2$-containing composite nano-powder catalyst, comprising:
   preparing a precursor reaction solution containing a compound comprising a platinum group metal and/or a non-noble metal;
   mixing a titanium-based metal ceramic compound powder into the precursor reaction solution, wherein the titanium-based metal ceramic compound has a particle size of between 1 nanometer and 100 nanometers, thereby forming liquid mixture;
   drying the liquid mixture and then decomposing it under oxidative thermal conditions, thereby forming a decomposed mixture; and
   cooling and grinding the decomposed mixture to obtain the catalyst powder.

12. The method according to claim 11, wherein the precursor reaction solution is composed of the compound comprising a platinum group metal and/or a non-noble metal, hydrochloric acid, and organic alcohol.

13. The method according to claim 11, wherein the precursor reaction solution is composed of the compound comprising a platinum group metal and/or a non-noble metal, hydrochloric acid, and water.

14. The method according to claim 11, wherein the liquid mixture is subjected to a drying treatment at a temperature of between 20° C. and 150° C.

15. The method according to claim 11, wherein the following steps are repeated until a molar ratio of the platinum group metal and/or non-noble metal to titanium in the powder catalyst reaches between 1:1 and 1:25:
- mixing the powder comprising a titanium-based metal ceramic compound with the precursor reaction solution;
- drying the liquid mixture;
- decomposing the liquid mixture under oxidative thermal conditions to form the decomposed mixture; and
- cooling the decomposed mixture followed by grinding the decomposed mixture.

16. The method according to claim 11, further comprising the step of subjecting the catalyst to an annealing treatment at a temperature of between 200° C. and 1000° C.

17. The method of claim 11, further comprising:
supporting one or more platinum group metal(s) and/or non-noble metal(s) on the surface of the $TiO_2$-containing composite nano-powder catalyst by a physical or chemical deposition method.

18. The method of claim 11, wherein the molar ratio of the platinum group metal and/or non-noble metal to titanium in the powder catalyst is from 1:1 to 1:10.

* * * * *